United States Patent [19]

Monett

[11] Patent Number: 4,507,035

[45] Date of Patent: Mar. 26, 1985

[54] IMPACT RESISTANT ASSEMBLY

[75] Inventor: Edward Monett, Westfield, N.J.

[73] Assignee: Roller Corporation of America, South Plainfield, N.J.

[21] Appl. No.: 553,040

[22] Filed: Nov. 18, 1983

[51] Int. Cl.$^3$ .......................... A63D 5/00; F16B 23/00
[52] U.S. Cl. ...................................... 411/377; 273/53; 411/383; 411/396; 411/900; 411/908
[58] Field of Search ................... 273/53; 411/371, 373, 411/377, 383, 396, 900, 901, 902, 903, 904, 907, 908

[56] References Cited

U.S. PATENT DOCUMENTS

| | | | |
|---|---|---|---|
| 121,060 | 4/1871 | Mutimer | 411/424 |
| 2,432,986 | 12/1947 | Forman | 411/903 X |
| 2,933,006 | 4/1960 | Gibb | 411/373 |
| 2,935,552 | 5/1960 | Forman | 411/903 X |
| 2,993,950 | 7/1961 | Forman | 411/903 X |
| 3,457,823 | 7/1969 | Dillon | 411/907 X |
| 3,557,654 | 1/1971 | Weidner | 411/904 X |
| 3,592,100 | 7/1971 | Trumbull et al. | 411/908 X |
| 4,295,767 | 10/1981 | Temple | 411/377 |
| 4,373,842 | 2/1983 | Bettini et al. | 411/377 |

Primary Examiner—Anton O. Oechsle
Attorney, Agent, or Firm—Jack B. Murray, Jr.

[57] ABSTRACT

An impact resistant assembly is provided which comprises a longitudinal, molded shaft composed of a thermoplastic material and having screw threads at one end thereof and a planar head plate at the opposite end. Adjacent to the head plate is an upper cylindrical shaft section upon which is securely positioned a metal collar, which is preferably provided with an enlarged metal rim, to support the head plate and adjacent cylindrical shaft section against substantial deformation during the subsequent molding thereon of a resilient, head member which is formed from a thermosetting material. It has been found that the combination of the planar head plate and the adjacent metal collar is essential to form the desired impact resistant assembly having the resilient, impact resistant head member molded thereon. The impact resistant assemblies of this invention are particularly suited for use in bowling alley backstops which are subjected to repeated and severe direct impacts by bowling balls of high mass.

10 Claims, 6 Drawing Figures

IMPACT RESISTANT ASSEMBLY

BACKGROUND OF THE INVENTION

1. Field of the Invention

This invention relates generally to impact resilient assemblies, and more particularly to impact resistant assemblies having a resilient head and a substantially inflexible shank.

2. Description of the Prior Art

In bowling alleys, the construction of backstops at the end of each alley serves to absorb the impact of the bowling balls once they strike the bowling pins, or otherwise pass the end of the alley on which the pins are positioned. The backstop also serves to deflect the balls in the desired direction to fascilitate ball retrieval, which is generally accomplished by the use of automated ball retrieval equipment. The speed and mass of the balls and the repeated impact shocks to which the backstops are subjected dictate that the backstops be constructed of rugged, impact resistant materials and components. For this reason, prior art backstops have been constructed of layers of oak board, hard rubber and a softer foam rubber, with the less resilient layer being positioned at the rearmost portion of the backboard, thereby absorbing these impacts with successive layers of increased rigidity to minimize shock damage and to dissipate the blows' shocks. A canvas or similar tear resistant material is placed on top of the outermost foam layer to minimize tearing of the foam.

Such prior art backstops are provided with a plurality of spaced apart resilient rivets, which are placed through holes running the width of the backstop in order to further reduce and dissipate these impacts. Such prior art rivets comprise unitary elongated rubber members which are provided with an enlarged head on one end and a tapered portion on the other end, which is provided with an enlarged circumferential rib. These rivets are inserted through the corresponding hole in the backstop and the tapered portion is pulled to stretch the rivet's elongated shaft, thereby firmly seating the enlarged head against the front face of the backstop. The shaft is further stretched until the circumferential rib is pulled out of the hole at the rear face of the backstop. Tension on the tapered end is then relaxed, and the rib is allowed to rest against this rear face. The tension of the stretched shaft then continues to force the head against the front face and the rib against the back face of the backboard.

However, the stretching of the rubber shaft causes stress facturing and hence a weakening of the thermoplastic material. Under such high tension, the repeated, severe impacts of the bowling balls thereon causes premature failure of these prior art rivets, and they must therefore be replaced frequently, which is a costly and time consuming operation.

A variety of fastening devices have been developed by the arts for a large number of end uses. These are represented by the following patents. However, none is readily adapted to solve the above problems in construction of highly reliable and long-lived bowling alley backstops which serve the purposes of minimizing and distributing the above-discussed impact shocks as a result of direct impact thereon of the weighty bowling balls.

U.S. Pat. No. 121,060 relates to a bolt in which the head of the bolt is contiguous to a rectangular portion and in which the shaft is of a circular cross-section and is provided with flanges to prevent the turning of the bolt when used in wood. The shaft's rectangular portion is said to prevent the turning of the bolt when it is used in iron. The end portion of the shaft is screw-threaded to receive a screw-nut.

U.S. Pat. No. 2,432,986 relates to a non-conductive fastener including a metal core and a plastic shell. The metal core is serrated along its entire length to enhance bonding of the plastic shell.

U.S. Pat. No. 2,935,552 also relates to a non-conductive fastener but employs a plastic body and a metallic core of triangular shape which is provided with peripherally located lug members which assist in physically gripping the plastic body into which the core is to be driven.

U.S. Pat. No. 2,993,950 discloses a multicomponent self-tapping and non-conductive fastener including a metal core, a synthetic resin shell and a metallic tapping screw insert.

U.S. Pat. No. 3,457,823 relates to a protective bolt and nut assembly utilizing an insulating cover formed of plastic to protect the nut and bolt assembly from shocks from structural members.

U.S. Pat. No. 3,557,654 discloses a composite fastener having a plastic head molded onto a metal insert having a threaded shank. Annular weathertight seals are provided to lock the plastic head in the appropriate position.

U.S. Pat. No. 3,592,100 discloses an insulating screw with a threaded shank and an enlarged head coated with a plastic insulating material.

U.S. Pat. No. 4,295,767 relates to corrosion resistant fasteners having a carbon steel treaded shank with a die cast zinc or aluminum head, and employing a reformable plastic washer positioned within the head. The annular recess defined between the head and a portion of the cylindrical shank receives a washer or seal which is reformable, which seal completely fills the recess about the shank of the fastener and provides the seal against corrosion.

U.S. Pat. No. 4,373,842 discloses a plastic-headed fastener comprising a plastic member that fits over the head of the fastener, an annular seal and a metallic screw shank. The annular seal is deformable and is fabricated from plastic.

SUMMARY OF THE INVENTION

In accordance with the present invention, an impact resistant assembly, adapted for use in combination with an impact resistant board, is provided which comprises a longitudinal molded shaft composed of a thermoplastic material and having at the lower end thereof screw thread means for removably securing said assembly to said board, and at the upper end thereof a planar head plate and a cylindrical shaft section adjacent to said head plate; metal collar means for supporting said head plate and said upper cylindrical shaft section against substantial deformation under thermosetting molding conditions; and a resilient head member molded about said head plate and said metal collar means under thermosetting molding conditions and formed from a thermosetting material.

It has been found that the combination of said planar head plate, preferably having a cross-section defined by from 3 to 8 sides, and said metal collar means, permits the formation of said assembly from an impact resistant thermoplastic shaft material (e.g., nylon) and a thermosetting impact resistant head member material (e.g., impact resistant rubber) without substantial deformation of the upper portions of the shaft (e.g., the head plate and upper cylindrical shaft section) during the thermosetting molding step and provides a molded head member which resists rotation about the shaft even with repeated direct impacts of the high mass bowling balls when the assembly is used, as preferred, in combination with bowling alley backboards. The invention provides devices which also are readily inserted into, and removed from, the backboards, thereby reducing the handling and shaft breakage problems which have accompanied the use of prior art backboard rivets.

DETAILED DESCRIPTION OF THE INVENTION

Figure 1:
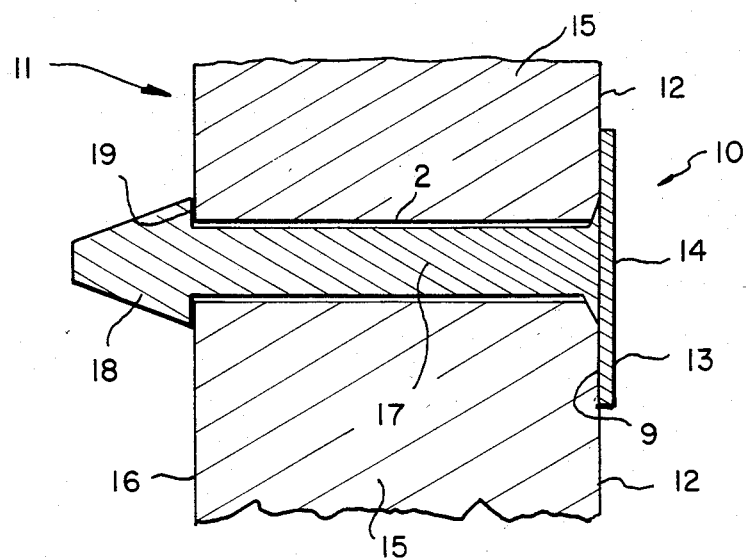
FIG. 1 is a cross-sectional, elevational view of a prior art backstop and rivet combination.

Referring to FIG. 1, there is illustrated an expandable prior art rivet, indicated generally at 10, which is shown positioned in backboard, indicated generally at 11. Rivet 10 comprises an elongated, cylindrical shaft 17, head 14 and tapered lower end 18, all of which are composed of a unitary, flexible material. Head 14 is circular and has a substantially flat outer surface 13 and a flattened lower surface 9, which adjoins the upper end of shaft 17 and which is adapted to be seated against front face 12 of the backboard 11. The lower end of shaft 17 is in turn provided with tapered end section 18 which adjoins shaft 17 by means of a circumferential rib member 19 which extends about the periphery of tapered end 18 and which is adapted to be seated against the rear face 16 of backboard 11. Rivet 10 is positioned within elongated channel 2 which extends the width of backboard 11 from the front face 12 to the rear face 16. Backboard 11 can comprise wood, metal, rubber, or other conventional resilient material, or a combination thereof.

In use of the prior art rivet 10, tapered end 18 is inserted into channel 2 at front face 12, and shaft 17 is then pushed to force the shaft 17 and the associated tapered end 18 through channel 2 and out the channel at the rear face 16. Then, tapered end 18 is pulled, stretching shaft 17 sufficiently to enable circumferential rib member 19 to be pulled out of the rear channel entrance. The pulling tension on the tapered end 18 is then relaxed to permit rib member 19 to be seated against rear face 16 of backboard 11, thereby holding rivet 10 firmly in position as a result of the contracting tension of stretched shaft 17, which remains in at least a slightly stretched relationship to its original, fully relaxed length. Therefore, the rivet 10, in the essential act of insertion into the backboard, can undergo stress cracking due to the stretching of the shaft 17, which can be lead to premature failure as a result of the further impact stress caused by the repeated, severe blows thereon of the high mass bowling balls. Also, in the event that another component part of the backboard 11 fails and it becomes necessary to remove the rivets 10 therefrom for reasons other than those which relate to the failure of the rivets themselves, the rivets 10 must be cut, to remove either the tapered end 18 or the head 14 therefrom, in order to allow removal of the rivet from the channel 2. Furthermore, the prior art rivets, when molded of a given length to permit use in a backboard 11 of a given width, cannot be readily employed in backboards of different widths (either wider or narrower) due to the close relationship which the length of the shaft 17 (in its original, fully relaxed state) must bear to the exact width of the selected channel 2. If a too-short rivet 10 is forced through a channel 2 which is too long than optimum, then the stress fracturing which the shaft undergoes is further increased due to the over stretching of the shaft, and the failure rate of these prior art devices can be still higher. Conversely, if a shaft 17 is employed in a too-narrow channel 2, then the rib member 19 and head 14 are not properly seated against rear face 16 and front face 12 of the backboard, respectively, and the thus-positioned rivet 10 cannot perform its shock absorbing and other associated functions effectively.

Accordingly, reference is now made to FIGS. 2 through 6 which illustrate a preferred embodiment of the impact resistant assembly of this invention, which is indicated generally at 21, and which comprises shaft 22 on which is molded a resilient head member 42 on one end thereof. The opposite end of shaft 22 is provided with a screw threaded section 24 which is adapted to receive a screw threaded nut 26 to allow device 21 to be removably affixed to backboard 54, as will be described in more detail below. Shaft 22 is composed of an impact resistant thermoplastic material (e.g., a conventional impact resistant nylon) and is preferably substantially inflexible. At its upper end, shaft 22 is provided with a planar head plate 40 and a cylindrical shaft section 29, which is positioned adjacent to head plate 40 and which is adapted to receive a metal collar 28 thereon. Collar 28 is hollow and cylindrical, and is composed of a heat resistant material such that it is substantially nondeformable under the conditions of temperature and pressure which are used during the molding of the resilient head member 42 onto the upper portion of shaft 22 about collar 28. Therefore, metal collar 28 is preferably composed of a heat resistant metal such as brass, steel, aluminum, copper, tin and the like. Collar 28 is also preferably formed so as to define an enlarged rim 28a about one end of collar 28. This enlarged rim 28a is intended to be positioned adjacent to the lower surfaces of head plate 40 to provide further support thereto during the molding of member 42 thereon.

Figure 2:
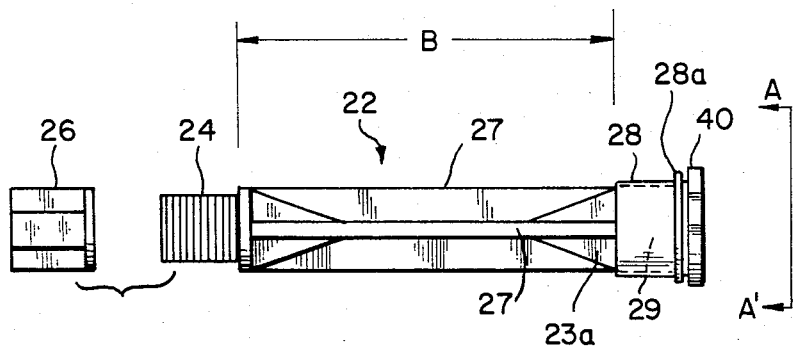
FIG. 2 is an elevational view of one embodiment of the devices of this invention, showing the shaft and nut dissassembled.
Figure 3:
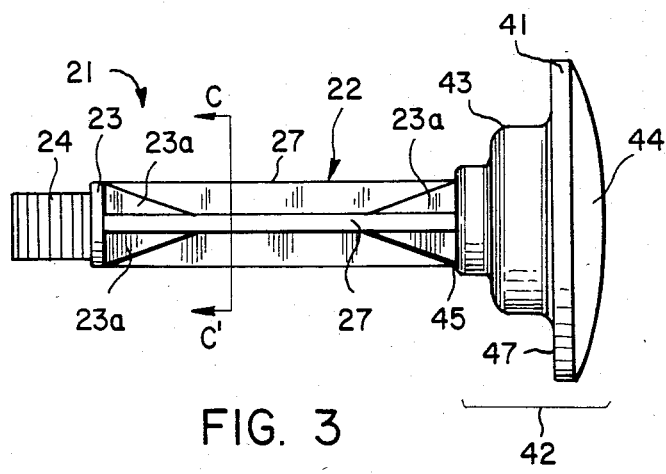
FIG. 3 is an elevational view of the device of FIG. 1 on which resilient head 24 has been formed.
Figure 5:
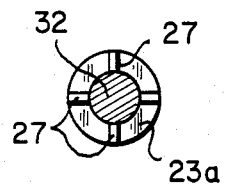
FIG. 5 is a transverse cross-sectional view of shaft 12 of FIG. 3 taken along axis C-C'.

Shaft 22 is also provided with a plurality (e.g., from about 3 to 6) of flange members 27 which extend longitudinally from upper shaft section 29 to a lower cylindrical shaft section 23 provided adjacent to threaded section 24. Flanges 27 are preferably evenly spaced apart about the circumference of, and are integrally formed with, a longitudinal shaft core 32, thereby acting to increase the impact strength of shaft core 32. In the preferred embodiment, core 32 is cylindrical and adjoins cylindrical shaft sections 23 and 29 via upwardly sloping surfaces 23a, as illustrated in FIGS. 2, 3 and 5.

Figure 4:
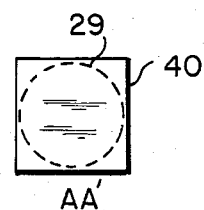
FIG. 4 is an end-on view of the shaft of FIG. 2, taken along axis A-A'.

In the embodiment of device 21 which is illustrated, head plate 40 is shown with a square cross section, having four sides as viewed end-on as in FIG. 4. However, other configurations of head plate 40 are also suitable so long as head plate 40 is planar and is provided with a plurality, and preferably from 3 to 8 sides, as viewed end-on. The provision of such a head plate 40 on the end of shaft 22, onto which end the resilient member 42 is to be molded, is essential in order to prevent the molded member 42 from rotating about shaft 22 when impacted with bowling balls in use in a backboard 54. The avoidance of such rotational motion prolonges the useful life of assemblies 21 by minimizing the extent to which each such impact damages the bond formed during the molding process between member 42 and the constituent parts of shaft 22 (plate 40 and collar 28) about which the member 42 is molded.

Resilient head member 42 can be formed from any thermosetting material which provides a molded member 42 which is hardened and impact resistant to withstand the repeated, direct impacts of the bowling balls thereon. Such thermosetting materials are conventional and include impact resistant rubbers (e.g., Neoprene rubber and Zytel rubber).

In manufacture of assemblies 21 of this invention, shaft 22 is first molded employing the selected thermoplastic material to form a unitary molded article comprising screw threaded section 24, lower cylindrical shaft section 23, cylindrical shaft core 32, flanges 27 and enlarged upper cylindrical shaft section 29, together with planar head plate 40. The precise molding method employed in forming shaft 22 is not critical and can include injection molding, transfer molding and the like. Also, the conditions of time, temperature and pressure for the molding step can be easily ascertained by one having ordinary skill in the art having in mind the particular thermoplastic material selected, and need not be described herein in order to provide a full understanding of the present invention.

Thereafter, a machined or otherwise formed supporting metal collar 28 is placed about the upper cylindrical section 29, as by forcing a collar 28 upwardly from lower end 23 onto upper shaft section 29. For this purpose, it is preferred that the inner diameter of the supporting metal collar 28 be only slightly greater than the outer diameter of shaft section 29 to allow as tight a fit therebetween as is possible, consistent with the need to permit the collar 28 to be forced thereon as described above, and the desire to prevent the collar 28 from moving from its desired position thereon during the subsequent manufacturing and handling steps, as will now be described. Further, it is preferred that the diameter of the upper cylindrical shaft section 29 be at least slightly greater than the diameter of the balance of the lower portions of shaft 22 to permit collar 28 to be more readily placed onto section 29 as described above.

After collar 28 is firmly seated on section 29 with rim 28a adjacent to head plate 40, resilient member 42 is molded onto the upper end of shaft 22 about the head plate 40 and collar 28. Preferably, resilient member 42 is formed so as to substantially completely cover all of plate 40 and collar 28 and to form a lower periphery of molded resilient material at 45 which bonds with at least a portion of shaft 22 (either a portion of flanges 27 or, more preferably, a portion of enlarged cylindrical section 29 which projects beyond the lowermost edge of metal collar 28) for a secure bond with shaft 22. The molded resilient member 42 is preferably provided with a slightly rounded upper head surface 44, although this upper surface 44 may be substantially flat, if desired. Preferably, the outer dimensions of the sides of planar head plate 40 are greater than the outer diameter of metal collar 28, and the outer diameter of enlarged collar rim 28a is substantially the same as the outer dimensions of the sides of plate 40, to provide an assembled device 21 having the more preferred impact resistant properties for use in backstops 54.

Figure 6:
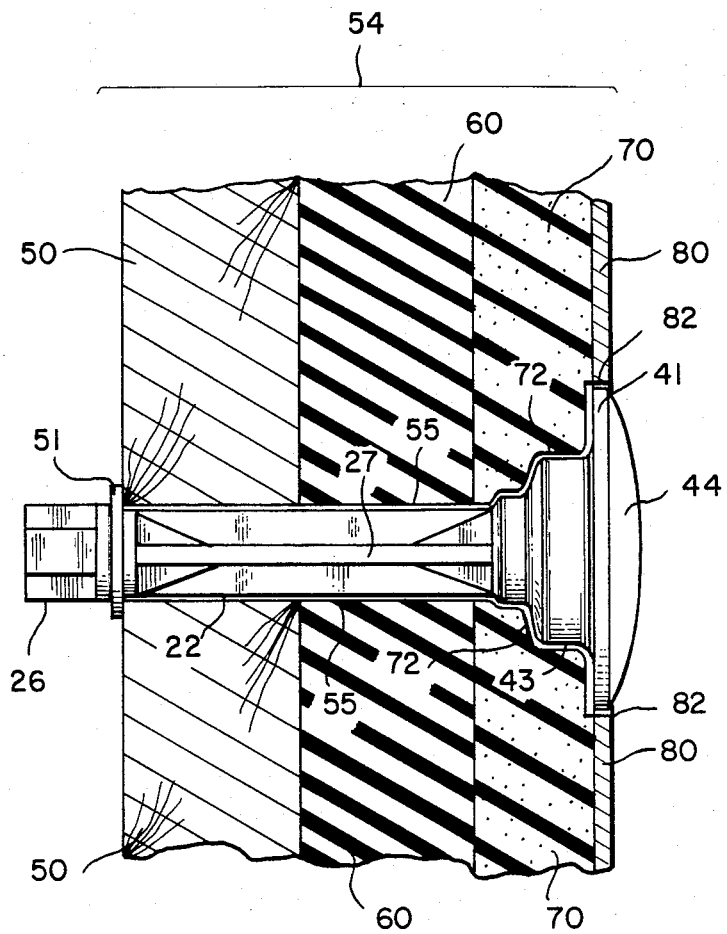
FIG. 6 is a cross-sectional, elevational view of a device of this invention in place in a backstop housing.

Referring to FIG. 6, the impact resistant assembly 21 of this invention is illustrated in place in a backboard 54 (of conventional construction and forming no part of this invention) comprising outer, tear-resistant facing 80 (such as canvas or similar tear resistant material), and three, successively less-compressible backboard layers 70, 60 and 50. First backboard layer 70 can comprise a foam rubber, second layer 60 a hard rubber and third layer 50 a wooden board. It will be understood that the devices 21 of this invention will be useful in backboards of constructions other than that which is depicted in FIG. 6. For example, the backboard can comprise more or fewer layers, which can be of a wide variety of compressibility and materials of construction, and the present invention is not intended to be limited thereby.

A longitudinal channel 55 is provided through backboard 54 which is of a length and diameter to receive shaft 22, and a cavity defined by walls 72 are provided in the outer portion of the first backboard layer(s) of a size and shape sufficient to house the resilient head member 42. Preferably, walls 72 are of a substantially identical shape as the lower surfaces 43 of member 42, and rim 41 of head member 42 is preferably of a thickness which corresponds to the thickness of backboard facing layer 80. Nut 26, and optionally also a washer 51, are secured onto the lower end of shaft 22 against the rear face of third backboard layer 50 to firmly affix the impact resistant assembly 21 therein.

The foregoing description has been given for the purposes of understanding only, and it will be understood that no necessary limitations should be read therefrom, as some modifications will be apparent from the above description.

I claim:

1. An impact resistant assembly, adapted for use in combination with an impact resistant board, which comprises: (i) a longitudinal molded shaft having screw thread means at the lower end of said shaft for removably securing said assembly to said board, and at the upper end thereof a planar head plate and a cylindrical shaft section adjacent to said head plate; (ii) metal collar means for supporting said head plate and said adjacent upper cylindrical shaft section against substantial deformation under thermosetting molding conditions; and (iii) a resilient head member molded about said head plate and metal collar means and formed from an impact resistant thermosetting material.

2. The impact resistant assembly of claim 1 wherein said shaft is molded from a thermoplastic material having a softening point at a temperature of above the temperature of said thermosetting molding conditions.

3. The impact resistant assembly of claim 1 wherein said upper cylindrical shaft section is characterized by an outside diameter which is greater than the outside diameter of the lower portions of said shaft, and wherein the outside dimensions of said planar head plate are greater than the said diameter of said upper cylindrical shaft section.

4. The impact resistant assembly of claim 3 wherein said metal collar means comprises a hollow, cylindrical metal collar positioned about said upper cylindrical shaft section.

5. The impact resistant assembly of claim 4 wherein said metal collar is provided at one end thereof with an enlarged metal rim, and wherein said metal collar is positioned upon said upper cylindrical shaft section such that said enlarged metal rim is adjacent to said head plate.

6. The impact resistant assembly of claim 5 wherein said metal rim has an outer diameter which is substantially the same as the outer diamensions of said head plate.

7. The impact resistant assembly of claim 1 wherein said shaft is provided with longitudinal, evenly spaced-apart flanges about a center, longitudinal shaft core between said upper cylindrical shaft section and said screw thread means, for increasing the impact strength of said shaft.

8. The impact resistant assembly of claim 1 wherein said resilient head member is of an enlarged longitudinal cross-section relative to said planar head plate and defines a rounded outer surface of said resilient head member.

9. The impact resistant assembly of claim 8 wherein said outer surface is convex.

10. The impact resistant assembly of claim 1 wherein said planar head plate is defined by a longitudinal cross-section having from about 3 to 8 sides.

* * * * *